(12) United States Patent
Mink et al.

(10) Patent No.: US 12,169,573 B2
(45) Date of Patent: Dec. 17, 2024

(54) SYSTEMS AND METHODS FOR ISOLATED AND PROTECTED FILE SYSTEM AND DATA RESTORATION

(71) Applicant: Dell Products L.P., Round Rock, TX (US)

(72) Inventors: Jacob Mink, Austin, TX (US); Jason Kolodziej, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 270 days.

(21) Appl. No.: 17/668,163

(22) Filed: Feb. 9, 2022

(65) Prior Publication Data

US 2023/0252172 A1 Aug. 10, 2023

(51) Int. Cl.
| | |
|---|---|
| G06F 21/62 | (2013.01) |
| G06F 21/57 | (2013.01) |
| G06F 21/60 | (2013.01) |
| G06F 21/72 | (2013.01) |

(52) U.S. Cl.
CPC ........ *G06F 21/6209* (2013.01); *G06F 21/572* (2013.01); *G06F 21/602* (2013.01); *G06F 21/72* (2013.01)

(58) Field of Classification Search
CPC .. G06F 21/6209; G06F 21/572; G06F 21/602; G06F 21/72
See application file for complete search history.

(56) References Cited

U.S. PATENT DOCUMENTS

| | | | |
|---|---|---|---|
| 7,024,581 B1* | 4/2006 | Wang | G06F 21/57 |
| | | | 714/38.14 |
| 10,878,084 B1* | 12/2020 | Voss | G06F 11/1469 |
| 10,977,381 B2* | 4/2021 | Mannan | G06F 21/6281 |
| 2015/0007175 A1* | 1/2015 | Potlapally | G06F 9/45558 |
| | | | 718/1 |
| 2019/0268318 A1* | 8/2019 | Tsirkin | G06F 21/44 |
| 2021/0325948 A1* | 10/2021 | Lee | G06F 3/0632 |
| 2023/0051347 A1* | 2/2023 | Sakib | G06F 9/45558 |

\* cited by examiner

*Primary Examiner* — Jung W Kim
*Assistant Examiner* — Alan L Kong
(74) *Attorney, Agent, or Firm* — Jackson Walker L.L.P.

(57) ABSTRACT

A method may include, within a security container executing on an information handling system, in response to a request from a process container to store data to a trusted partition of a memory, wherein the process container is configured to execute user processes of the information handling system: validating whether the data is safe and trusted, responsive to determining that the data is safe and trusted, causing a storage container associated with the trusted partition and configured to manage data stored to the trusted partition to store a read-only file of the data to the trusted partition, and persisting the read-only file through a wipe of the information handling system, such that the read-only file is accessible following a restore of the information handling system following the wipe.

12 Claims, 3 Drawing Sheets

SYSTEMS AND METHODS FOR ISOLATED AND PROTECTED FILE SYSTEM AND DATA RESTORATION

TECHNICAL FIELD

The present disclosure relates in general to information handling systems, and more particularly to systems and methods for implementing an isolated and protected file system and data restoration from such protected file system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

From time to time, it may be desirable to clear, or "wipe", all data stored on an information handling system and then re-provision the information handling system for use. Existing data wipe technologies leverage locally external sources or remote sources to store and reapply configurations and data specific to a particular information handling system. However, if the end user has lost his or her local external source or if the remote source becomes inaccessible, then it may become infeasible to restore the information handling system. Further, using such approaches may be expensive in terms of network transfer time, cost of cloud resources, operating system-specific tools, and other resources, depending of the data requiring backup and the external source used.

SUMMARY

In accordance with the teachings of the present disclosure, the disadvantages and problems associated with data backup and restoration may be reduced or eliminated.

In accordance with embodiments of the present disclosure, an information handling system may include a processor, a memory communicatively coupled to the processor, and executable instructions embodied in non-transitory computer-readable media communicatively coupled to the processor, the instructions configured to, when read and executed by the processor, implement a plurality of executable containers comprising: a process container configured to execute user processes of the information handling system; a storage container associated with a trusted partition of the memory and configured to manage data stored to the trusted partition; and a security container configured to, in response to a request from the process container to store data to the trusted partition, validate whether the data is safe and trusted, responsive to determining that the data is safe and trusted, cause the storage container to store a read-only file of the data to the trusted partition, and persist the read-only file through a wipe of the information handling system, such that the read-only file is accessible following a restore of the information handling system following the wipe.

In accordance with these and other embodiments of the present disclosure, a method may include, within a security container executing on an information handling system, in response to a request from a process container to store data to a trusted partition of a memory, wherein the process container is configured to execute user processes of the information handling system: validating whether the data is safe and trusted, responsive to determining that the data is safe and trusted, causing a storage container associated with the trusted partition and configured to manage data stored to the trusted partition to store a read-only file of the data to the trusted partition, and persisting the read-only file through a wipe of the information handling system, such that the read-only file is accessible following a restore of the information handling system following the wipe.

In accordance with these and other embodiments of the present disclosure, an article of manufacture of include a non-transitory computer readable medium and computer-executable instructions carried on the computer readable medium, the instructions readable by a processor, the instructions, when read and executed, for causing the processor to implement a plurality of executable containers comprising: a process container configured to execute user processes of the information handling system; a storage container associated with a trusted partition of the memory and configured to manage data stored to the trusted partition; and a security container configured to, in response to a request from the process container to store data to the trusted partition, validate whether the data is safe and trusted, responsive to determining that the data is safe and trusted, cause the storage container to store a read-only file of the data to the trusted partition, and persist the read-only file through a wipe of the information handling system, such that the read-only file is accessible following a restore of the information handling system following the wipe.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
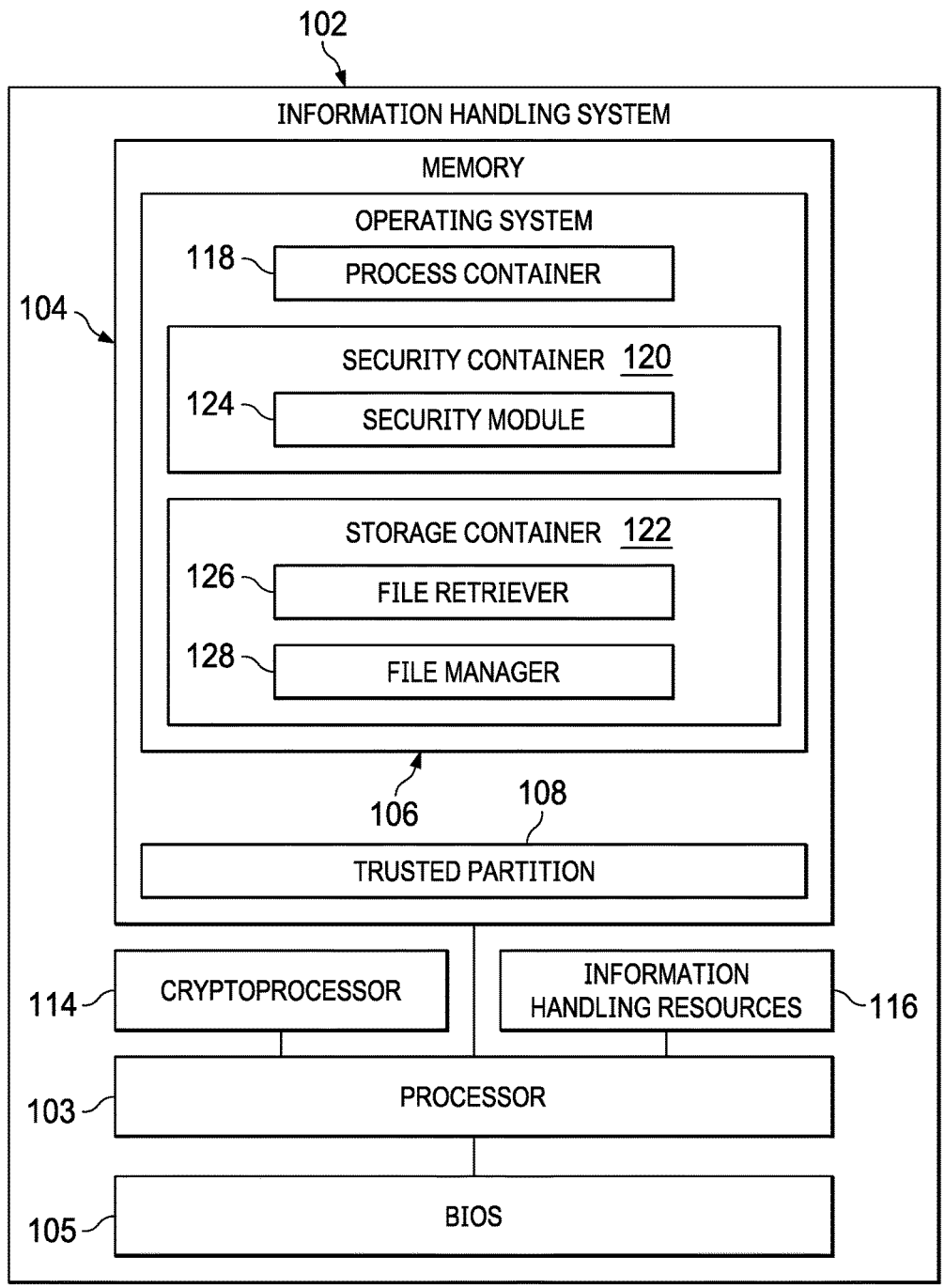
FIG. 1 illustrates a block diagram of an example information handling system, in accordance with embodiments of the present disclosure.
Figure 2:
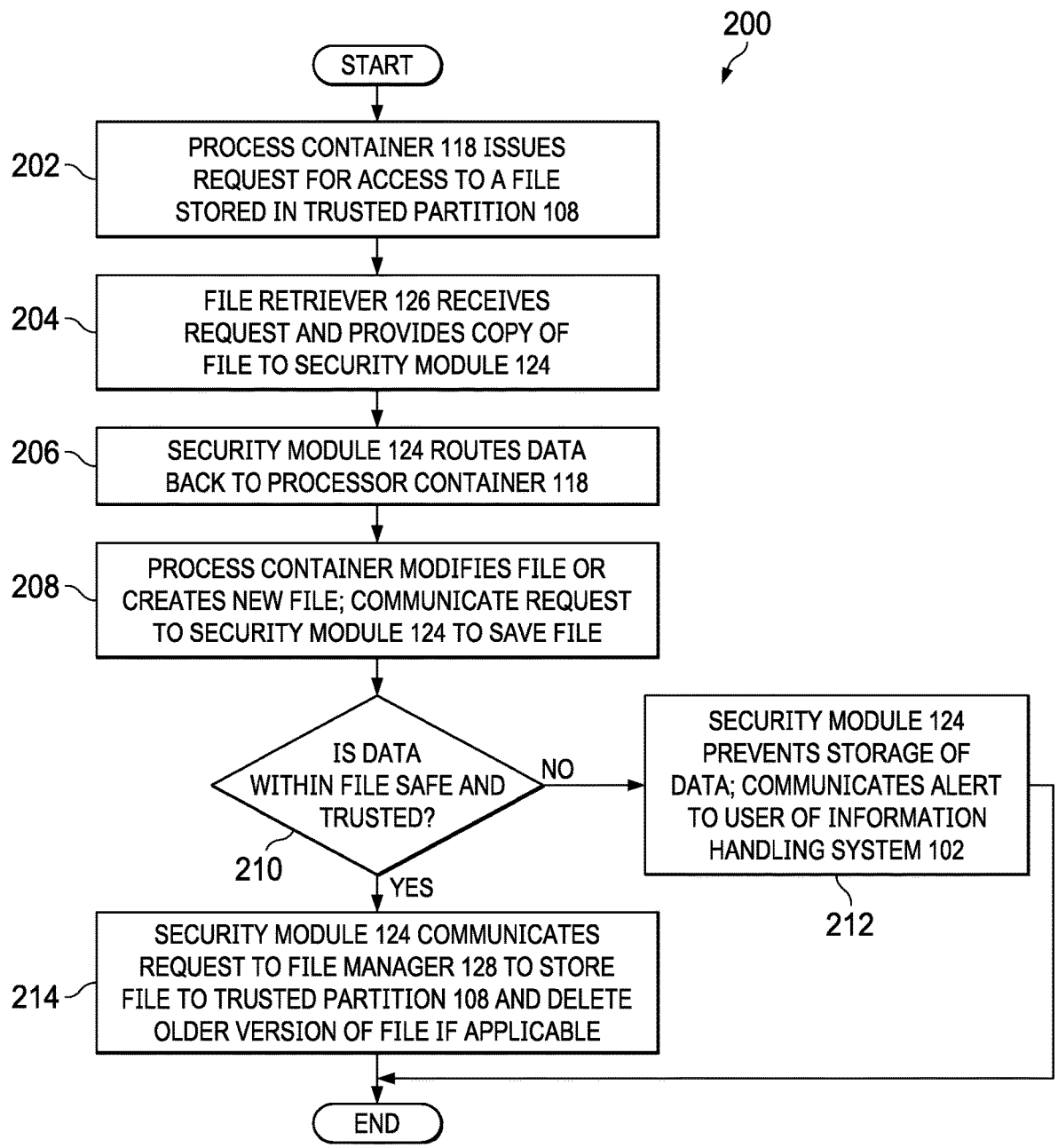
FIG. 2 illustrates a flow chart of an example method for storing data to an isolated and protected file system, in accordance with embodiments of the present disclosure.
Figure 3:
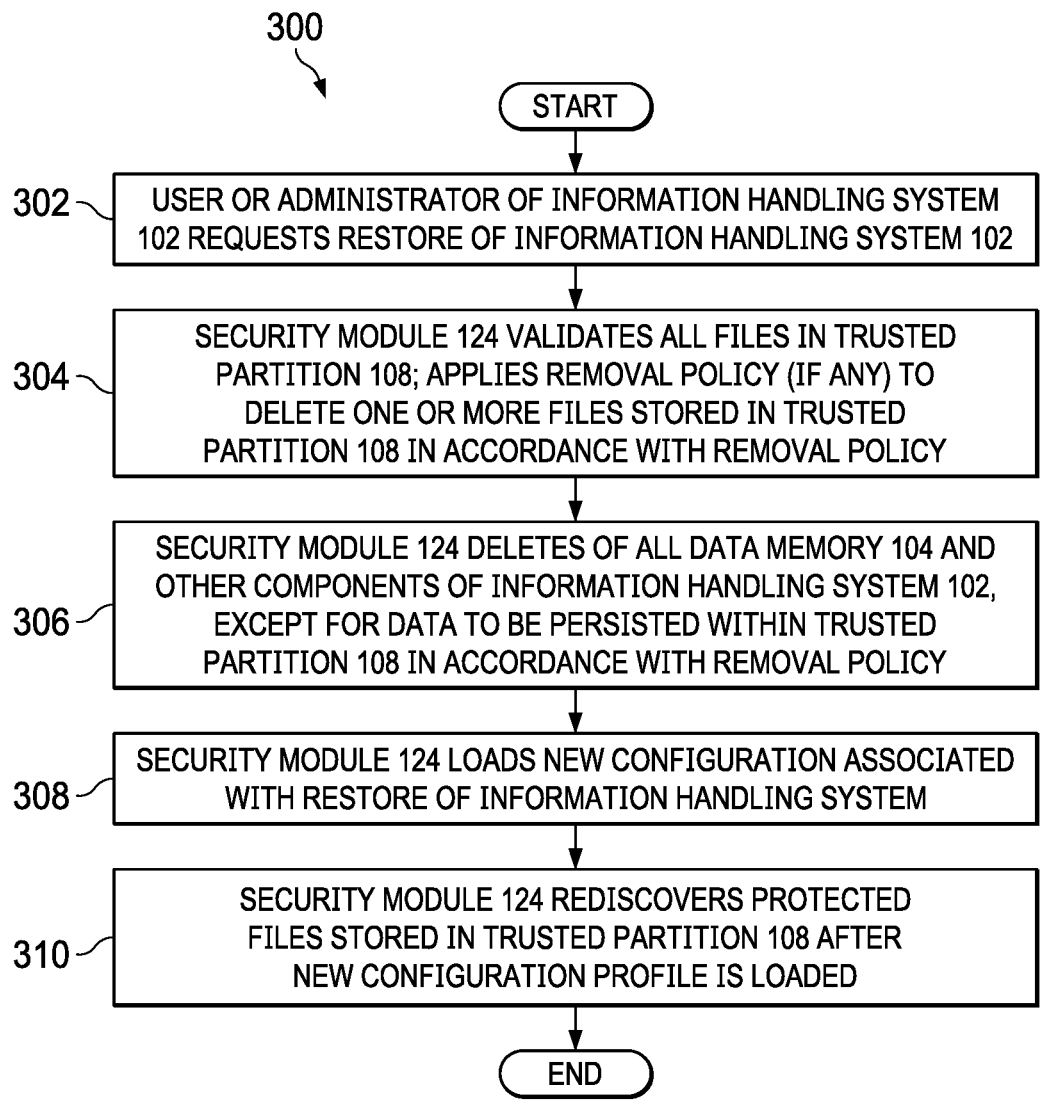
FIG. 3 illustrates a flow chart of an example method for restoring data from an isolated and protected file system, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a server. In other embodiments, information handling system 102 may be a personal computer (e.g., a desktop computer, a laptop, notebook, tablet, handheld, smart phone, personal digital assistant, etc.). As depicted in FIG. 1, information handling system 102 may include a processor 103, a memory 104 communicatively coupled to processor 103, a BIOS 105 communicatively coupled to processor 103, a cryptoprocessor 114 communicatively coupled to processor 103, and one or more information handling resources 116 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off. As shown in FIG. 1, memory 104 may have stored thereon an operating system 106 and may include a trusted partition 108.

Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

As depicted in FIG. 1, a plurality of containers, including a process container 118, security container 120, and storage container 122, may execute on top of operating system 106. In some embodiments, one or more of process container 118, security container 120, and storage container 122, may comprise virtual machines or guest operating systems, and operating system 106 may be or may otherwise comprise a hypervisor upon which process container 118, security container 120, and storage container 122 may execute.

Process container 118 may comprise a containerized space in which all processes and untrusted data are handled. Process container 118 may maintain ephemeral for the lifecycle of information handling system, and data and instructions of the process container may be considered non-critical and may be removed by request of a user or administrator. During use of information handling system 102, a user may operate in process container 118.

Security container 120 may comprise a hardware-attested, secure, and trusted container configured to validate any interactions between process container 118 and storage container 122. Security container 120 may be hardware attested by BIOS 105 and/or cryptoprocessor 114, and may, during operation, ensure that any user data or information is persistently stored in trusted partition 108, is protected from malicious modification, and may be securely and safely repopulated after a wipe of information handling system 102.

As shown in FIG. 1, security container 120 may include security module 124. Security module 124 may comprise a subcomponent of security container 120 configured to scan persistent data stored in trusted partition 108 for malicious content (e.g., viruses). In addition, security module 124 may be configured to receive and process configuration changes to information handling system 102 (e.g., changes pushed by an administrator of information handling system 102) and may be configured to initiate a system wipe to all portions of information handling system except for trusted partition 108.

Storage container 122 may comprise a secure file system container for storing any user data that should be persisted across configuration changes and/or system wipes (e.g., in accordance with a configuration policy of information handling system 102). Data stored in trusted partition 108 by storage container 122 may be read-only, such that such data may not be modified—but only created, read, or deleted. Maintaining such user data may ensure its integrity by forcing transactions to be processed by security container 120. Storage container 122 may be mapped to trusted partition 108, which may be considered trusted because any data stored to trusted partition 108 has been subject to security verification by security container 120 and is read-only up to deletion. As shown in FIG. 1, storage container 122 may include a file retriever 126 and a file manager 128.

File retriever 126 may comprise any program (or combination of programs) of executable instructions configured to locate data persisted in trusted partition 108.

File manager 128 may comprise any program (or combination of programs) of executable instructions configured to discover data persisted in trusted partition 108 across boot sessions of information handling system 102 and/or system configuration changes of information handling system 102, agnostic of operating system or memory format. File manager 128 may also perform deletion of data in trusted partition 108 and creation of new files in response to trusted data arriving from security container 120.

BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Cryptoprocessor 114 may be communicatively coupled to processor 103 and/or BIOS 105 (e.g., via a suitable communication bus) and may include any system, device, or apparatus configured to carry out cryptographic operations on data communicated to it from processor 103, BIOS 105, and/or another component of information handling system 102. In some embodiments, cryptoprocessor 114 may be compliant with the Trusted Platform Module specification, a successor specification, and/or any other similar specification. In some embodiments, cryptoprocessor 114 may be configured to generate random numbers, generate encryption keys (e.g., RSA keys), generate and maintain hash key tables of hardware and software components of information handling system 102, generate and maintain configuration parameters associated with hardware and software components of an information handling system, wrap (e.g., encrypt) keys, unwrap (e.g., decrypt) keys, and/or store keys (e.g., endorsement key, storage root key, attestation identity keys, storage keys).

Generally speaking, information handling resources 116 may include any component system, device or apparatus of information handling system 102, including without limitation processors, buses, computer-readable media, input-output devices and/or interfaces, storage resources, network interfaces, motherboards, electro-mechanical devices (e.g., fans), displays, and/or power supplies.

The approach described above, which utilizes process container 118, security container 120, and storage container 122, may preserves an end user's trusted data, securely and locally, in order to restore the trusted data after a wipe of information handling system 102 is complete, agnostic of the operating system and configuration applied after the restore (provided the operating system applied after the restore is capable of creating, managing, and maintaining containerized environments of process container 118, security container 120, and storage container 122). Accordingly, trusted user data may persistently remain in place with information handling system 102, potentially eliminating the need for any additional backup and/or restoration steps.

FIG. 2 illustrates a flow chart of an example method 200 for storing data to an isolated and protected file system, in accordance with embodiments of the present disclosure. According to one embodiment, method 200 may begin at step 202. As noted above, teachings of the present disclosure may be implemented in a variety of configurations of information handling system 102.

At step 202, a user or process executing within processor container 118 may request access to a file stored in trusted partition 108. At step 204, file retriever 126 may receive the request and provide a copy of the file to security module 124. At step 206, security module 124 may route the data back to processor container 118.

At step 208, the user or process may modify the file or create a new file, and then may communicate a request to security module 124 to save the file. At step 210, security module 124 may validate that data within the file is safe and trusted. If the data of the file is validated as safe and trusted, method 200 may proceed to step 214. Otherwise, method 200 may proceed to step 212.

At step 212, in response to security module 124 being unable to validate that data within the file is safe and trusted, security module 124 may prevent storage of the data, and communicate an alert to the user of information handling system 102. After completion of step 212, method 200 may end.

At step 214, in response to security module 124 being able to validate that data within the file is safe and trusted, security module 124 may communicate a request to file manager 128 to store the file to trusted partition 108. Further, in the event that the file is a new edited version of a file already stored on trusted partition 108, security module 124 may communicate a request to file manager 128 to delete the older version. After completion of step 214, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

FIG. 3 illustrates a flow chart of an example method 300 for restoring data from an isolated and protected file system, in accordance with embodiments of the present disclosure.

At step 302, a user or administrator of information handling system 102 may request a restore of information handling system 102. At step 304, in response to the request, security module 124 may validate all files in trusted partition 108, and apply a removal policy (if any) to delete one or more files stored in trusted partition 108 in accordance with the removal policy.

At step 306, security module 124 may delete all data of memory 104 and other components of information handling system 102, except for data to be persisted within trusted partition 108 in accordance with the removal policy.

At step 308, security module 124 may load a new configuration associated with the restore of information handling system 102. At step 310, security module 124 may be able to rediscover protected files stored in trusted partition 108 once the new configuration profile is loaded, retrieving files as described with respect to method 200, above.

After completion of step 310, method 300 may end.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
    a processor;
    a memory communicatively coupled to the processor; and
    executable instructions embodied in non-transitory computer-readable media communicatively coupled to the processor, the instructions configured to, when read and executed by the processor, implement a plurality of executable containers comprising:
    a process container configured to execute user processes of the information handling system, wherein the process container is associated with an untrusted partition of the memory;
    a storage container associated with a trusted partition of the memory and configured to manage data stored to the trusted partition; and
    a security container configured to, in response to a request from the process container to access and store data to the trusted partition:
    cause the storage container to retrieve a requested data from the trusted partition and provide a copy of the requested data to the security container;
    transmit the copy of the requested data to the process container and receive a processed file of the data from the process container;
    validate whether the processed file of the data is safe and trusted;

responsive to determining that the processed file of the data is safe and trusted, cause the storage container to store a read-only file of the processed file of the data to the trusted partition;

persist the read-only file through a wipe of the information handling system, such that the read-only file is accessible following a restore of the information handling system following the wipe; and wherein the process container, the storage container, and the security container each comprise an isolated virtual machine configured to execute on a hypervisor of an operating system of the information handling system.

2. The information handling system of claim 1, wherein the security container is further configured to, in connection with causing the storage container to store the read-only file of the data to the trusted partition, responsive to determining that the read-only file is a newer version of an older version of the read-only file stored on the trusted partition, cause the storage container to delete the older version from the trusted partition.

3. The information handling system of claim 1, further comprising a basic input/output system comprising boot firmware configured to be executed by the processor of the information handling system when the information handling system is booted and/or powered on, and configured to initialize information handling resources of the information handling system, the basic input/output system further configured to hardware attest the security container.

4. The information handling system of claim 1, further comprising a cryptoprocessor communicatively coupled to the processor and configured to hardware attest the security container.

5. A method comprising,
within a security container executing on an information handling system,
in response to a request from a process container to access and store data to a trusted partition of a memory,
wherein the process container is configured to execute user processes of the information handling system, and wherein the process container is associated with an untrusted partition of the memory:
causing a storage container to retrieve a requested data from the trusted partition and provide a copy of the requested data to the security container;
transmitting the copy of the requested data to the process container and receive a processed file of the data from the process container;
validating whether the processed file of the data is safe and trusted;
responsive to determining that the processed file of the data is safe and trusted, causing the storage container associated with the trusted partition and configured to manage data stored to the trusted partition to store a read-only file of the processed file of the data to the trusted partition;
persisting the read-only file through a wipe of the information handling system, such that the read-only file is accessible following a restore of the information handling system following the wipe; and
wherein the process container, the storage container, and the security container each comprise an isolated virtual machine configured to execute on a hypervisor of an operating system of the information handling system.

6. The method of claim 5, further comprising in connection with causing the storage container to store the read-only file of the data to the trusted partition and responsive to determining that the read-only file is a newer version of an older version of the read-only file stored on the trusted partition, causing the storage container to delete the older version from the trusted partition.

7. The method of claim 5, wherein the security container is hardware-attested by a basic input/output system comprising boot firmware configured to be executed by the processor of the information handling system when the information handling system is booted and/or powered on, and configured to initialize information handling resources of the information handling system.

8. The method of claim 5, wherein the security container is hardware-attested by a cryptoprocessor of the information handling system.

9. An article of manufacture comprising:
a non-transitory computer readable medium; and
computer-executable instructions carried on the non-transitory computer readable medium, the instructions readable by a processor, the instructions, when read and executed, for causing the processor to implement a plurality of executable containers comprising:
a process container configured to execute user processes of the information handling system, wherein the process container is associated with an untrusted partition of the memory;
a storage container associated with a trusted partition of the memory and configured to manage data stored to the trusted partition; and
a security container configured to, in response to a request from the process container to access and store data to the trusted partition:
cause the storage container to retrieve a requested data from the trusted partition and provide a copy of the requested data to the security container;
transmit the copy of the requested data to the process container and receive a processed file of the data from the process container;
validate whether the processed file of the data is safe and trusted;
responsive to determining that the processed file of the data is safe and trusted, cause the storage container to store a read-only file of the processed file of the data to the trusted partition;
persist the read-only file through a wipe of the information handling system, such that the read-only file is accessible following a restore of the information handling system following the wipe; and
wherein the process container, the storage container, and the security container each comprise an isolated virtual machine configured to execute on a hypervisor of an operating system of the information handling system.

10. The article of claim 9, wherein the security container is further configured to, in connection with causing the storage container to store the read-only file of the data to the trusted partition, responsive to determining that the read-only file is a newer version of an older version of the read-only file stored on the trusted partition, cause the storage container to delete the older version from the trusted partition.

11. The article of claim 9, wherein the security container is hardware-attested by a basic input/output system comprising boot firmware configured to be executed by the processor of the information handling system when the information handling system is booted and/or powered on, and configured to initialize information handling resources of the information handling system.

12. The article of claim 9, wherein the security container is hardware-attested by a cryptoprocessor of the information handling system.

\* \* \* \* \*